United States Patent
Scheps

(12) 
(10) Patent No.: US 6,723,225 B2
(45) Date of Patent: Apr. 20, 2004

(54) AUTOMOBILE ENGINE DISABLING DEVICE

(75) Inventor: Richard Scheps, Rancho Santa Fe, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 470 days.

(21) Appl. No.: 09/919,515

(22) Filed: Jul. 31, 2001

(65) Prior Publication Data

US 2003/0024827 A1 Feb. 6, 2003

(51) Int. Cl.⁷ .............................. C25B 9/00; C25C 7/00
(52) U.S. Cl. .................... 205/687; 204/242; 204/275.1; 180/279; 361/233; 361/504
(58) Field of Search ................. 205/687; 204/242, 204/275.1; 180/279; 361/233, 504

(56) References Cited

U.S. PATENT DOCUMENTS

| | | |
|---|---|---|
| 4,255,789 A | 3/1981 | Hartford et al. |
| 4,751,633 A | 6/1988 | Henn et al. |
| 4,852,454 A | 8/1989 | Batchelder |
| 4,930,392 A | 6/1990 | Wilson |
| 5,293,527 A | 3/1994 | Sutton et al. |
| 5,409,638 A | 4/1995 | Battochi |
| 5,503,059 A | 4/1996 | Pacholok |
| 5,933,075 A | 8/1999 | Ditson |
| 5,952,600 A | 9/1999 | Herr |
| 6,124,805 A | 9/2000 | Gabbard |

*Primary Examiner*—Arun S. Phasge
(74) *Attorney, Agent, or Firm*—Allan Y. Lee; Michael A. Kagan; Peter A. Lipovsky

(57) ABSTRACT

The present invention has application to the disabling of vehicles such as automobiles and other vehicles having an engine controlled by a motor controller or other component that is vulnerable to malfunctions induced by a pulse of electrical energy. The invention has application to remotely disabling vehicles in high speed pursuits. In one aspect of the invention, an apparatus for remotely disabling an electronic device may be deployed from a platform. In various embodiments, the platform may be a stationary platform in the path of an approaching vehicle incorporating the electronic device or a movable platform for pursuing the vehicle.

42 Claims, 1 Drawing Sheet

AUTOMOBILE ENGINE DISABLING DEVICE

BACKGROUND OF THE INVENTION

The present invention relates generally to devices for generating electrical interference. More specifically, it relates to devices that transmit electrical impulses to disable vehicles.

SUMMARY OF THE INVENTION

The present invention is a system for remotely disabling an electric or electronic device. It has applications for disabling vehicles such as automobiles and other vehicles having an engine controlled by a motor controller vulnerable to malfunctions induced by a pulse of electrical energy, and, in a more specific application, for remotely disabling vehicles from a platform. It may be used to disable surface vehicles such as automobiles, tanks, dune buggies, boats, ships, or any other surface vehicle. It can be used for remotely disabling vehicles such as those being chased in high speed pursuits.

Generally, the present invention can be used to deliver a pulse of electric energy to disable a pursued vehicle from a platform at a fixed location or from a mobile platform. The invention includes an electrical energy source that is a pulse forming network mounted on the platform. It also includes an electrolyte delivery system coupled to the electrical energy source for conducting electrical energy between the platform, the pursued vehicle and ground.

In accordance with the present invention, the device and/or vehicle may be disabled from a platform at a remote location within range of the device. The platform may be a stationary platform in the path of an approaching vehicle, or it may be a movable platform such as a helicopter.

In a further aspect of the invention, streams of an electrolyte conduct one or more pulses of electrical energy between the pulse forming network and the device to be disabled. In a specific embodiment, the device is an automobile engine microprocessor.

In another aspect of the invention, the problems in stopping a pursued vehicle as well as other problems are solved by providing an apparatus for disabling an electronic device that is part of a pursued vehicle by causing a malfunction in the electronic device. In various embodiments, the electronic device may be an automobile engine microprocessor or any other device used to control the mobility of a vehicle that is vulnerable to being caused to malfunction as a result of a pulse of electrical energy.

The electrolyte delivery system may be any type of equipment used for propelling a stream of liquid across a distance. In one embodiment, the electrolyte delivery system includes an electrolyte gun coupled to an electrolyte reservoir. In various embodiments, the electrolyte reservoir may be any suitable container for a liquid electrolyte. In accordance with the present invention, the delivery system may include an electrolyte gun comprised of a high pressure pump for pumping the electrolyte fluid through a flexible or rigid tube that directs the stream of liquid electrolyte into electrical contact with the electronic device.

In a further aspect of the invention, a method is provided for remotely disabling an electronic device. In one embodiment, the method includes the steps of propelling a stream of electrolyte fluid from the platform between a pulse forming network and the electronic device and delivering one or more pulses of electrical energy through the stream of electrolyte fluid to disable the electronic device.

In another aspect of the invention, an engine disabling device delivers one or more pulses of electrical energy to an electronic device controlling the engine to stop the engine. In a specific embodiment, the engine disabling device includes a pulse generator that supplies one or more pulses of electrical energy to disable an electronic device. The disabling device also includes a mechanism that propels a stream of electrolyte to conduct one or more pulses of electrical energy from the pulse generator to the electronic device.

BRIEF DESCRIPTION OF THE DRAWINGS

The above and other aspects, features and advantages of the present invention will be more apparent from the following more specific description thereof, presented in conjunction with the following drawing wherein.

DESCRIPTION OF AN EMBODIMENT

Figure 1:
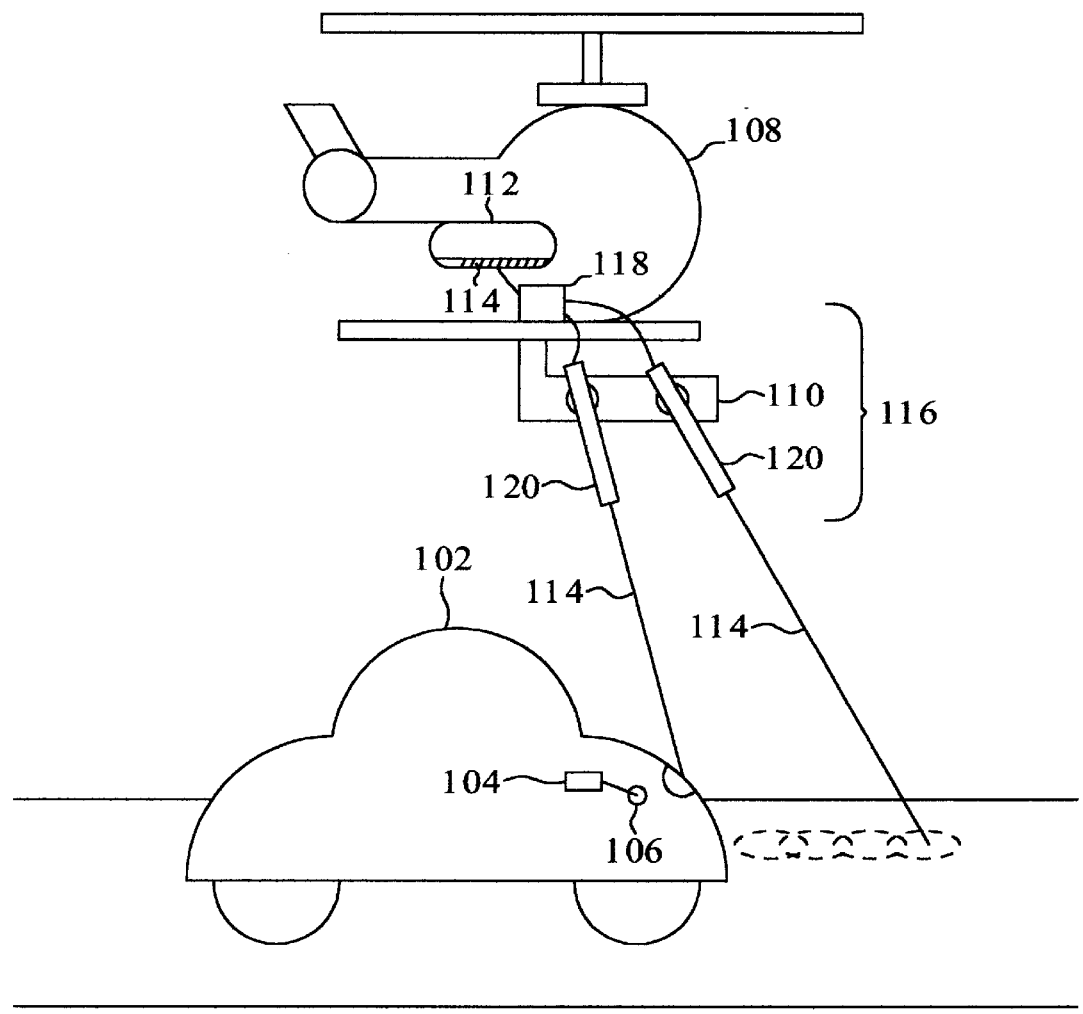
FIG. 1 is a diagram of an automobile engine disabling device according to an embodiment of the present invention.

Automobiles have been manufactured for some time with microprocessors to control ignition timing, fuel ignition, and other functions required for automobile motor operation. Automobile engine microprocessors are especially susceptible to electrical interference, a vulnerability exploited by the present invention to disable the vehicle remotely from a platform. Although the invention is described as having an automobile as the pursued vehicle, it is not limited to those applications. It is within the scope of the present invention that other vehicles may be pursued, such as, for example, any surface vehicle. Further, the platform used to disable the pursued vehicle may be a mobile platform, such as, for example, an automobile, a motorcycle, or an airborne vehicle such as a helicopter. The platform, however, need not be moving. Any suitable platform for carrying the disabling device may be used, including a platform at fixed station positioned in the path of the vehicle to be disabled.

FIG. 1 is a diagram of an engine disabling device according to an embodiment of the present invention. Shown in FIG. 1 are an automobile 102, an automobile microprocessor 104, an automobile microprocessor ground connection 106, a pursuit platform 108, an pulse forming network 110, an electrolyte reservoir 112, high-viscosity electrolyte fluid 114, electrolyte guns 116, a high pressure pump 118, and fluid guides 120.

The microprocessor 104 is electrically connected to the chassis and body of the automobile 102 by the microprocessor ground connection 106. Although the microprocessor 104 is depicted and described as the susceptible component, this is by way of example only, and it is within the scope of the present invention, that part 104 represents any vehicle component that could be disabled or caused to malfunction by an electrical pulse in accordance with the present invention.

The platform 108 carries the pulse forming network 110, the electrolyte reservoir 112, the high-viscosity electrolyte fluid 114, the electrolyte guns 116, and a high pressure pump 118. In this example, the platform 108 is a helicopter. The target device may be any device having a component that is subject to malfunction in response to a high voltage electrical discharge.

The pulse forming network 110 may be, for example, a high-voltage, low-current electrical power source having a voltage of, for example, about 1,000,000 volts at a current of about 100 microamperes. Other voltages and currents for the pulse forming network 110 may be selected to suit specific applications. The pulse forming network 110 should be electrically insulated from the platform 108 to prevent electrical pulses from striking the platform 108.

The electrolyte reservoir 112, the high-viscosity electrolyte fluid 114, the electrolyte guns 116, and the high pressure pump 118 constitute an electrolyte delivery system that establishes an electrically conductive path between the pulse forming network 110 and the automobile 102. The electrolyte reservoir 112 contains a suitable volume of the electrolyte fluid 114. The electrolyte fluid 114 is an electrically conductive fluid that preferably has a high-viscosity to maintain a solid stream as it is propelled through air. Examples of the electrolyte fluid 114 include refrigerant liquids and salt water.

The electrolyte guns 116 may be made according to well known techniques to propel streams of the electrolyte fluid 114 using, for example, the high pressure pump 118 capable of pumping a jet of the electrolyte fluid 114 at preferably 50 PSI or more from the electrolyte reservoir 112. The electrolyte guns 116 may include a fixed or movable mount mounted on the platform 108 for aiming the electrolyte guns 116. As an alternative to a movable mount, each of the fluid guides 120 may be a flexible or rigid tube or a combination of a flexible tube and a rigid tube for aiming the electrolyte guns 116 and for reducing the exposure of the electrolyte fluid 114 to dispersive influences, such as moving air. The electrolyte guns 116 are electrically connected to the pulse forming network 110, and are preferably electrically insulated from the platform 108 to avoid coupling electrical energy to the platform 108.

As an alternative to the high pressure pump 118, a compressed air tank (not shown) may be used to pressurize the electrolyte reservoir 112 according to well known techniques to propel the high-viscosity electrolyte fluid 114 through each of the fluid guides 120. As another alternative, the electrolyte reservoir 112 may contain a pressurized propellant.

In operation, the electrolyte guns 116 propel one stream of the high-viscosity electrolyte fluid 114 from the platform 108 to the chassis or body of the automobile 102 and another stream of the electrolyte fluid 114 to an electrical return, which may be one of the tires of the automobile 102 or a portion of the roadbed just ahead of one of the tires of the automobile 102. When the streams of the electrolyte fluid 114 complete an electrical circuit between the pulse forming network 110, the automobile 102, and the electrical return, the pulse forming network 110 delivers one or more high-voltage pulses through the chassis of the automobile 102 and the electrical return to induce a malfunction in the microprocessor 104. In some applications, a single pulse may be used, while in other applications, multiple pulses having a repetition rate of about 100 Hz or less may be advantageous.

When one or more pulses of electrical energy are conducted through the electrolyte to the microprocessor 104 and an electrical return, a voltage discharge occurs, for example, between a tire and ground as shown. Alternatively, the return may be conducted through a stream of the electrolyte fluid 114 from another portion of the automobile 102, for example, a window, a bumper, or other accessible portion of the automobile 102 suitable for creating a voltage gap. When a pulse of electrical energy bridges the voltage gap, a broad spectrum of frequencies is generated in a manner similar to lightning. The generation of high frequencies near the microprocessor 104 enhance the coupling of electrical energy from the pulse forming network 110 to induce a malfunction in the microprocessor 104. The malfunction may result from a ground spike generated by the high-voltage pulses or from charging the chassis of the automobile 102 to a high voltage until a short circuit from the chassis to ground across a voltage gap occurs, disabling the motor of the automobile 102.

While the invention herein disclosed has been described by means of specific embodiments and applications thereof, other modifications, variations, and arrangements of the present invention may be made in accordance with the above teachings other than as specifically described to practice the invention within the spirit and scope defined by the following claims.

What is claimed is:

1. An apparatus for disabling an electronic device comprising:

a pulse forming network for supplying one or more pulses of electrical energy to disable an electronic device;

an electrolyte delivery system coupled to the pulse forming network for propelling a stream of electrolyte between the pulse forming network and the electronic device to conduct one or more pulses of electrical energy between the pulse forming network and the electronic device; and a platform coupled to the electrolyte delivery system for carrying the pulse forming network and the electrolyte delivery system.

2. The apparatus for disabling an electronic device of claim 1 wherein the pulse forming network generates a pulse of electrical energy at about 1,000,000 volts.

3. The apparatus for disabling an electronic device of claim 1 wherein the pulse forming network generates an electrical current of about 100 microamperes.

4. The apparatus for disabling an electronic device of claim 1 wherein the pulse forming network generates a single pulse.

5. The apparatus for disabling an electronic device of claim 1 wherein the pulse forming network generates a series of pulses having a repetition rate of less than about 100 Hz.

6. The apparatus for disabling an electronic device of claim 1 wherein the electronic device is a microprocessor of a surface vehicle.

7. The apparatus for disabling an electronic device of claim 1 wherein the platform is stationary.

8. The apparatus for disabling an electronic device of claim 1 wherein the platform is moveable.

9. The apparatus for disabling an electronic device of claim 8 wherein the platform is an automobile, a motorcycle, or an airborne platform.

10. The apparatus for disabling an electronic device of claim 9 wherein the airborne platform is a helicopter.

11. The apparatus for disabling an electronic device of claim 1 wherein the electrolyte delivery system comprises:

an electrolyte fluid;

an electrolyte reservoir coupled to the electrolyte fluid; and an electrolyte gun coupled to the electrolyte reservoir.

12. The apparatus for disabling an electronic device of claim 11 wherein the electrolyte gun comprises a high pressure pump.

13. The apparatus for disabling an electronic device of claim 11 wherein the electrolyte gun comprises a flexible or rigid tube coupled to the high pressure pump.

14. The apparatus for disabling an electronic device of claim 1 wherein the electrolyte delivery system completes an electrical circuit between the pulse forming network, the electronic device, and an electrical return.

15. The apparatus for disabling an electronic device of claim 1 wherein the pulse forming network is electrically insulated from the platform to prevent electrical pulses from striking the platform.

16. A method of disabling an electronic device comprising the steps of:
   (a) propelling a stream of electrolyte fluid from a platform to couple an pulse forming network to the electronic device; and
   (b) delivering a pulse of electrical energy through the stream of electrolyte fluid between the pulse forming network and the electronic device.

17. The method of claim 16 wherein step (b) comprises delivering a pulse of electrical energy having a voltage of about 1,000,000 volts.

18. The method of claim 16 wherein step (b) comprises delivering a pulse of an electrical energy having a current of about 100 microamperes.

19. The method of claim 16 wherein step (b) comprises generating a single pulse.

20. The method of claim 16 wherein step (b) comprises generating a series of pulses having a repetition rate of less than about 100 Hz.

21. The method of claim 16 wherein step (a) comprises coupling the pulse forming network to a microprocessor of a surface vehicle.

22. The method of claim 16 wherein step (a) comprises propelling the stream of electrolyte fluid from a stationary platform.

23. The method of claim 16 wherein step (a) comprises propelling the stream of electrolyte fluid from a moveable platform.

24. The method of claim 23 wherein step (a) comprises propelling the stream of electrolyte fluid from an automobile, a motorcycle, or an airborne platform.

25. The method of claim 24 wherein step (a) comprises propelling the stream of electrolyte fluid from a helicopter.

26. The method of claim 16 wherein step (b) comprises completing an electrical circuit between the pulse forming network, the electronic device, and an electrical return.

27. The method of claim 16 wherein the pulse forming network is electrically insulated from the platform to prevent electrical pulses from striking the platform.

28. An apparatus for disabling an electronic device comprising:
   means for supplying one or more pulses of electrical energy to disable an electronic device;
   means for propelling a stream of electrolyte to couple the means for supplying one or more pulses of electrical energy to the electronic device; and
   means for carrying the means for supplying the pulses of electrical energy and the means for propelling the stream of electrolyte.

29. The apparatus for disabling an electronic device of claim 28 wherein the means for supplying one or more pulses of electrical energy generates a pulse of electrical energy having a voltage of about 1,000,000 volts.

30. The apparatus for disabling an electronic device of claim 28 wherein the means for supplying one or more pulses of electrical energy generates an electrical current of about 100 microamperes.

31. The apparatus for disabling an electronic device of claim 28 wherein the means for supplying one or more pulses of electrical energy generates a single pulse.

32. The apparatus for disabling an electronic device of claim 28 wherein the means for supplying one or more pulses of electrical energy generates a series of pulses having a repetition rate of less than about 100 Hz.

33. The apparatus for disabling an electronic device of claim 28 wherein the electronic device is a microprocessor of a surface vehicle.

34. The apparatus for disabling an electronic device of claim 28 wherein the means for carrying is stationary.

35. The apparatus for disabling an electronic device of claim 28 wherein the means for carrying is moveable.

36. The apparatus for disabling an electronic device of claim 35 wherein the means for carrying is an automobile, a motorcycle, or an airborne platform.

37. The apparatus for disabling an electronic device of claim 36 wherein the airborne platform is a helicopter.

38. The apparatus for disabling an electronic device of claim 28 wherein the means for propelling a stream of electrolyte comprises:
   an electrolyte fluid;
   an electrolyte reservoir coupled to the electrolyte fluid; and
   an electrolyte gun coupled to the electrolyte reservoir.

39. The apparatus for disabling an electronic device of claim 38 wherein the electrolyte gun comprises a high pressure pump.

40. The apparatus for disabling an electronic device of claim 38 wherein the electrolyte gun comprises a flexible or rigid tube coupled to the high pressure pump.

41. The apparatus for disabling an electronic device of claim 28 wherein the means for propelling completes an electrical circuit between the means for supplying, the electronic device, and an electrical return.

42. The apparatus for disabling an electronic device of claim 28 wherein the pulse forming network is electrically insulated from the platform to prevent electrical pulses from striking the platform.

* * * * *